Dec. 8, 1953   B. E. O'CONNOR ET AL   2,661,917
AIRCRAFT LANDING WHEEL SHIMMY DAMPER
Filed Dec. 11, 1950   2 Sheets-Sheet 1
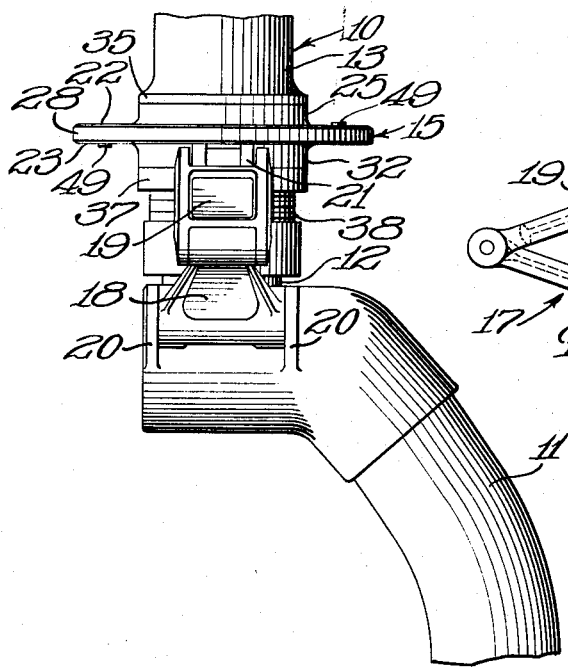
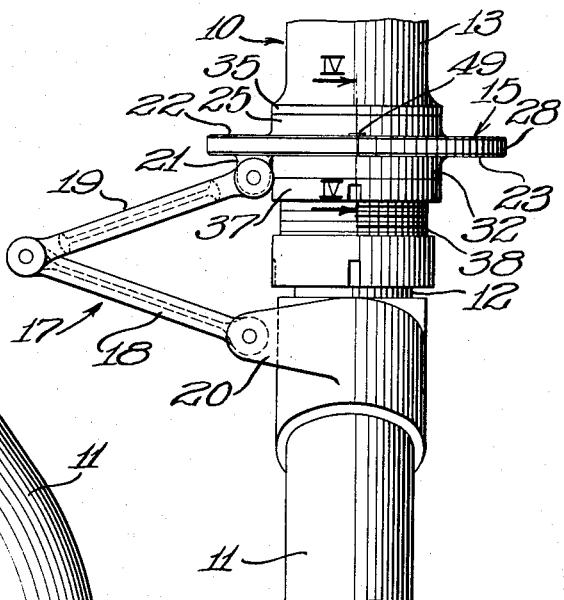
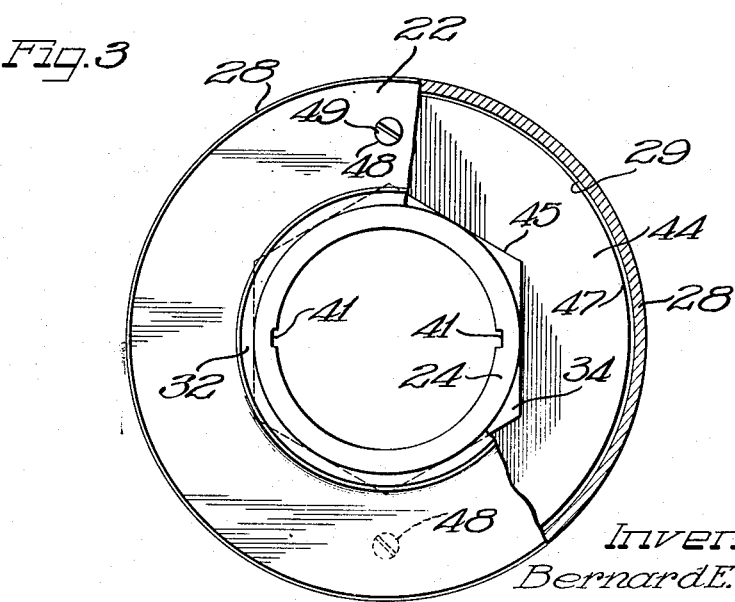
Inventors:
Bernard E. O'Connor
Benjamin Fuente
by Hill, Sherman, Meroni, Gross & Simpson Attys

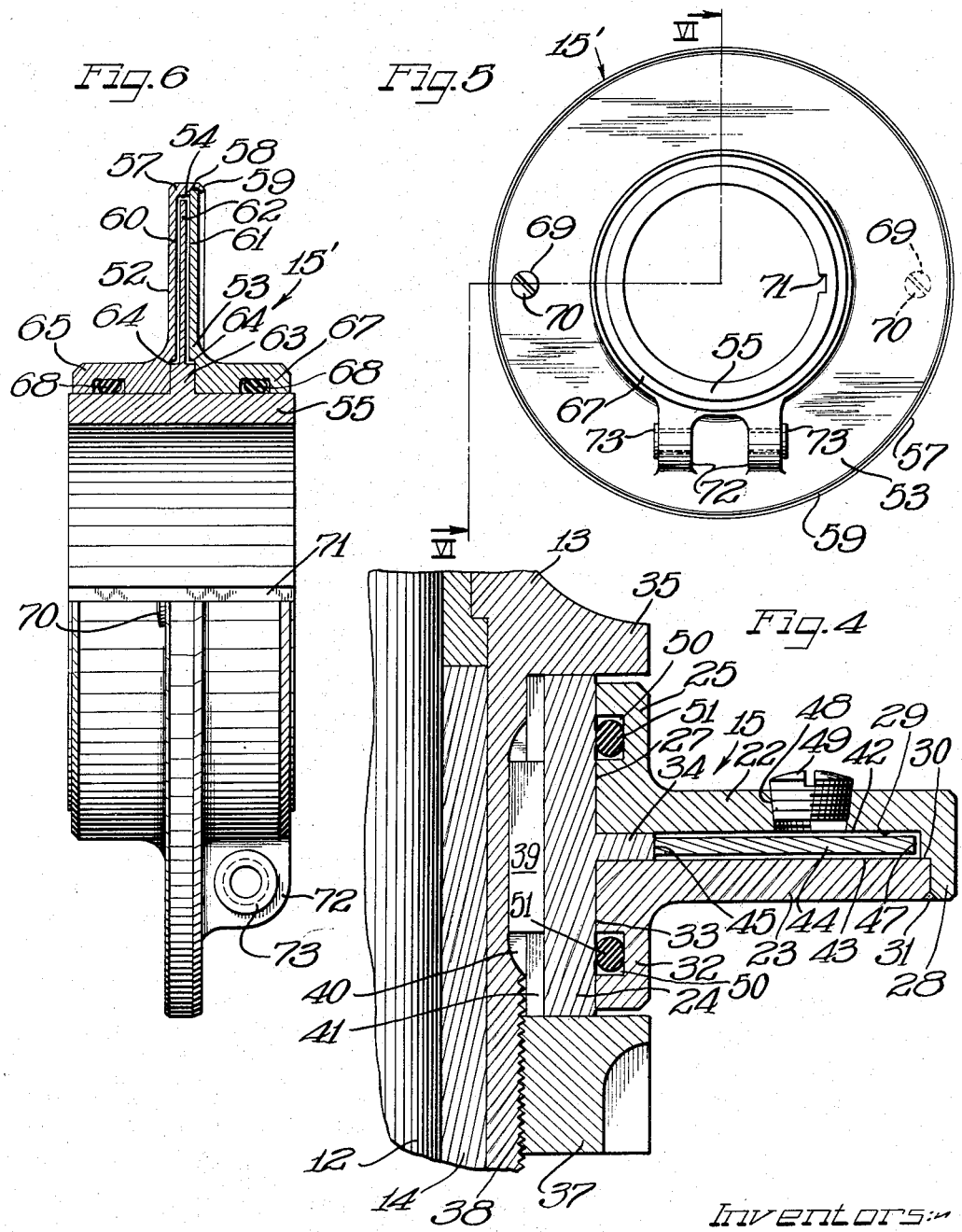

Patented Dec. 8, 1953

2,661,917

UNITED STATES PATENT OFFICE 2,661,917

AIRCRAFT LANDING WHEEL SHIMMY DAMPER

Bernard E. O'Connor, Buffalo, and Benjamin Fuente, Hamburg, N. Y., assignors to Houdaille-Hershey Corporation, Detroit, Mich., a corporation of Michigan Application December 11, 1950, Serial No. 200,218

4 Claims. (Cl. 244—104)

The present invention relates to improvements in viscous fluid shimmy dampers especially adapted for preventing shimmy in swiveling or caster-type aircraft landing wheel assemblies.

It is an important object of the present invention to provide a simplified economical shimmy damper installation for aircraft landing wheels or similar swiveling or caster-type mechanisms wherein due to various factors high frequency vibrations or oscillations may develop in service and which it is highly desirable to dampen.

A further object of the invention is to provide an improved shimmy damper installation which is especially useful in conjunction with the torque scissors of a caster wheel landing strut in aircraft.

Other objects, features and advantages of the present invention will be readily apparent from the following detailed description of certain preferred embodiments thereof taken in conjunction with the accompanying drawings, in which:

Figure 1 is a fragmentary rear elevational view of a swivel-type aircraft landing gear strut structure showing the present invention applied thereto;

Figure 2 is a side elevational view of the landing gear strut shown in Fig. 1;

Figure 3 is a top plan view of the shimmy damper used in the installation of Fig. 1 and with certain parts broken away and in section to reveal details of structure;

Figure 4 is an enlarged fragmentary detail sectional view taken substantially on the line IV—IV of Fig. 2;

Figure 5 is a bottom plan view of a modified form of the damper; and

Figure 6 is a partially elevational and partially sectional detail view taken substantially on the irregular line VI—VI of Fig. 5.

In a swiveling or caster-type aircraft landing wheel assembly such as shown in Figs. 1 and 2 the carriage comprises an oleo strut 10 attached non-rotatably to the aircraft (not shown) and a swivel leg or wheel yoke 11 which carries the stud shaft providing the wheel axle (not shown). A swivel connection between the yoke 11 and the strut proper 10 is effected by means of an upwardly projecting cylinder 12 which is rotatably and vertically reciprocably engaged within a tubular casing 13 of the strut including bearing structure 14 (Fig. 4) therein for the cylinder 12.

For damping shimmy in the wheel-supporting gear including the yoke 11, an improved shimmy damper assembly 15 is provided. This damper is of a kind that has a working amplitude of 360° so as to permit full swiveling of the wheel about the axis of the cylinder 12. Furthermore, the damper is of a kind which is mounted rotatably upon the strut 10 and is operatively connected to the yoke 11 through the medium of a torque scissors 17 comprising torque arms or links 18 and 19 pivotally connected together at their outer ends while the inner end of the link 18 is connected pivotally between bosses or ears 20 provided therefor on the wheel yoke 11 and the corresponding inner end of the link 19 is connected pivotally on a horizontal axis to connecting ears or bosses 21 on the damper assembly 15. Through this arrangement vertical movements between the yoke 11 and the shimmy damper 15 as occasioned by operation of the oleo strut 10 are accommodated but nevertheless an operative connection is maintained between the wheel yoke and the shimmy damper. It will thus be apparent that the damper 15 provides, in effect, a rotary slip-ring connection for the torque scissors 17 with the strut 10.

Described in general terms, the shimmy damper 15 is of the kind wherein the torque resistance of shear films of a suitable viscous fluid operating between opposed parallel working surfaces relatively movable in their respective planes is relied upon to resist and dampen vibratory oscillations or shimmy. For this purpose, the damper utilizes a viscous fluid which will function efficiently with substantially uniformity throughout an extreme range of temperature conditions. For example, a silicone fluid of 30,000 centistokes viscosity rating as measured in a Saybolt viscosimeter has been found to produce excellent results.

By the term "shear film" is meant a laminar layer of the viscous fluid which is greater than a mere lubricating film but is much thinner than will result in a mere fluid frictional drag relationship between the opposing parallel working surfaces of the damper and the viscous fluid. Stated another way, the working surface spacing is properly correlated to the viscosity of the fluid to afford a linear velocity gradient, as distinguished from a non-linear velocity gradient, so as to produce in the fluid layer a condition of shear rather than a fluid drag relationship when there is a tendency toward rapid relative parallel movement of the working surfaces. This condition arises from the mathematical fact that the velocity of a laminar layer of fluid is equal to the velocity of the moving boundary times the distance from the stationary boundary to the layer in question divided by the distance between boundaries if the proportion of the viscosity to the distance between the boundaries is sufficiently high. This can be shown graphically by a straight diagonal line tilting in the direction of movement of the moving surface to represent linear velocity gradient, and a curving line from the stationary surface to the moving surface to represent non-linear velocity gradient where the surfaces are further apart than will result in a linear velocity gradient when considered with respect to the viscosity of the fluid in question. Thus, while the viscous fluid when in a shear film between opposed relatively parallel moving working surfaces, will allow comparatively free relative parallel movement of the working surfaces during slow relative motion, rapid relative movements are resisted due to the shear resistance of the film of the viscous fluid between the working surfaces.

The novel structure by which the improved results of the present invention are attained in the shimmy damper 15 comprises an annular housing having shimmy dampen means therein and externally surrounding and rotatable about the strut 10.

To this end, the damper housing comprises (Figs. 3 and 4) a cooperative pair of separately formed and functionally integrally united housing members 22 and 23 and a mounting hub ring 24.

The housing member 22 is preferably constructed as an annular flange-like disk element of a thickness consistent with the character of the material from which made to withstand the service usage to which put. At its inner margin the housing member 22 is provided with an axially outwardly projecting annular hub flange 25 providing an internal annular friction bearing surface 27 of substantial width complementary in diameter to the opposing journal bearing external surface of the hub ring 24. At its outer margin the housing member 22 is provided with an integral annular flange 28 extending axially in the opposite direction to the hub flange 25 and defining with the body of the housing member 22 a damper chamber 29.

The remaining housing member 23 is also in the form of an annular flange-like disk element constructed of appropriate material of a thickness suitable to withstand all service usage to which put. Formation of the housing member 23 is such as to make it complementary to the housing member 22 and to serve as a closure plate for the chamber 29. For this purpose the housing member 23 is preferably of somewhat smaller external diameter than the member 22 but of somewhat larger diameter than the outer peripheral diameter of the chamber 29 as defined by the inner periphery of the housing member flange 28, so that the outer margin of the housing member 23 will seat upon a shoulder 30 provided by a rabbet groove at the inner corner of the terminus of the flange 28. Assembly of the housing plate members 22 and 23 is maintained permanently as by welding 31 at the juncture of the outer margin of the housing member 23 and the flange 28. At its inner margin, the housing member 23 has an axially outwardly extending hub bearing flange 32 substantially like the hub bearing flange 25 of the housing member 22 and providing an internal friction bearing surface 33 of substantial width bearingly engaging the external bearing surface of the hub ring 24.

For practical reasons the damper 15 is preferably constructed as a unit that can be assembled complete at the factory by mass production methods of manufacture ready for assembly with the airplane landing wheel strut 10. Therefore, the bearing hub 24 has means thereon for retaining the chamber-forming housing members 22 and 23 permanently against axial separation from the hub member. By preference such means comprise a lateral rib or flange 34 formed integrally in one piece with the body of the hub ring 24 and projecting radially from the outer bearing surface of the hub ring. The flange 34 is engaged in slidable bearing relation between the inner margins of the opposed faces of the housing members 22 and 23 and thereby retains the assembled housing members 22 and 23 and the hub ring 24 in predetermined axial relationship.

At its opposite ends, the hub ring 24 projects beyond the respective adjacent ends of the housing member hub bearing flanges 25 and 32, respectively. Thereby, the hub ring 24 is adapted to be mounted in encircling relation about the lower end portion of the strut casing 13 with the upper end of the hub ring engaged against the lower surface of an annular radially extending limit shoulder flange 35 on the casing, while the lower end of the hub ring is engaged by a retaining nut 37 turned up on a threaded peripheral portion 38 of the strut casing. In this mounted position, the hub ring 24 is held non-rotatably by means of a key 39 fitting in a keyway 40 in the outer periphery of the casing and a complementary keyway 41 in the inner periphery of the hub ring 24. Thus, that portion of the damper housing provided by the housing members 22 and 23 is supported for free rotary but non-axial movement about the hub ring portion 24 of the housing which is held non-axially and non-rotatably movable relative to the strut casing 13.

Within the chamber 29, the casing or housing members 22 and 23 have respective spaced parallel annular working surfaces 42 and 43 which operatively oppose parallel working surfaces of a relatively thin resistance member 44 the thickness of which is less to a predetermined extent than the space between the working surfaces 42 and 43 to afford shear films of a viscous coupling, damping fluid between the opposed working surfaces of the housing members and of the resistance member. For example, where a silicone fluid as described hereinabove fills the chamber 29, the cooperating elements may be so proportioned that the shear film spacing between the opposed cooperating working surfaces will be provided by approximately .010 inch clearance. It has been found that adequate damping accrues from the use of a single resistance member 44 having relatively large working surface area. This enables the damper to be made in a very compact form and quite economically.

The resistance member 44 may be constructed as a simple die stamped substantially ring-shaped plate from material as thin as practicable as will withstand buckling in the presence of the torsional stresses imposed in the operation of the damper as a result of the resistance to shear of the viscous damping fluid.

In order that the resistance disk or plate 44 may be self-adjustable for shear film spacing in operation, the plate may be disposed axially loosely but relatively non-rotatably about the hub provided by the hub flange 34. On the other hand, the resistance plate 44 may be fixedly secured to the flange 34 with the working surfaces of the plate spaced equidistantly from the opposite faces of the flange 34. In either instance, a simple and expedient manner of assembling the resistance plate 44 with the flange 34 comprises having the flange of non-circular outline, such for example as hexagonal as best seen in Fig. 3, with the inner periphery of the plate 44 provided with a complementary closely fitting edge 46.

At its outer periphery, the resistance plate 44 is preferably formed with a cylindrical edge 47 which concentrically opposes the inner periphery of the housing flange 28 in shear film spaced relation. Thereby the area of the outer periphery of the resistance plate cooperates with the substantial axially facing working surface areas to afford, in the aggregate, large resistance area for operation of the viscous damping coupling.

After assembly of the various damper housing and resistance plate components has been completed, the chamber 29 is filled with the viscous damping fluid through any one of a pair of filling openings 48 provided in respectively the housing member 22 and the housing member 23 and subsequent to filling closed by a sealing plug 49. The openings 48 cooperate during filling in that while the fluid is introduced through one of the openings, the remaining opening provides an air exhaust vent. When the chamber 29 has been completely filled, both of the openings 48 are closed by means of the plugs 49. It will be observed that the filling openings 48 are preferably provided at diametrically opposite sides of the housing.

In order to prevent leakage of the damping fluid past the hub bearing of the housing, each of the housing hub bearing flanges 25 and 32 is preferably provided with an annular groove 50 within which is accommodated a resilient sealing ring 51 preferably of the O-ring type formed from rubber or synthetic rubber.

The torque scissors linkage connection ears or bosses 21 are preferably provided on the lower housing member 23 and may be formed integrally in one piece therewith, if preferred.

In the modified form of damper 15' shown in Figs. 5 and 6, much the same structural relationships are present as in the damper unit 15. In the modification, housing members 52 and 53 are secured together to define therebetween a working or damper chamber 54 and are mounted upon a hub ring 55 which provides the radially inner closure for the chamber 54 similarly as provided by the cooperative housing components of the damper 15.

The damper housing member 52 is formed of substantial diameter and has an outer marginal axially extending annular flange 57 formed with an inner side terminal edge rabbet groove 58 within which the outer margin of the housing member 53 is seated. Permanent assembled relation of the housing members 52 and 53 is maintained by means of a retaining flange 59 at the extremity of the body flange 57 and which terminal flange is turned over into retaining engagement with the margin of the cover member 53.

The cover members 52 and 53 are provided with inner opposing working surfaces 60 and 61 which oppose parallel respective large area working surfaces on a thin resistance member 62 in the form of a disk plate as thin as practicable consistant with service requirements. The clearance between the working surfaces 60 and 61 and the opposing working surfaces of the resistance member 62 is predetermined to afford shear films of viscous fluid in the spacings.

In this modified form of the damper, the resistance member 62 is formed integral in one piece with the hub ring 55. To this end the resistance member is formed as a radial annular extension of a substantially thicker but narrower shoulder flange disposed annularly in one piece to project radially from the midpoint of the outer bearing surface of the hub ring 55. The inner internal margins of the housing members 52 and 53 are rabbet grooved as indicated at 64 to accommodate the shoulder flange 63 in sliding bearing relation.

Bearing engagement of the housing members 52 and 53 with the hub ring 55 is effected by means of respective oppositely axially extending inner marginal bearing flanges 65 and 67, respectively. Sealing rings 68 supported at the bearing faces of the flanges 65 and 67 prevent leakage of fluid thereby from the damper housing.

Viscous damping fluid is filled into the chamber 54 through appropriate filling openings 69 which subsequent to filling of the unit are closed by means of closure plugs 70.

The damper unit 15' is adapted to be mounted on a wheel supporting strut similarly as the damper 15 and the inner face of the hub ring 55 is provided with a keyway 71 to retain it non-rotatably on the strut.

Pivotal connection of the upper link of a torque scissors linkage to the damper unit 15' is adapted to be effected to attachment bosses or ears 72 provided on the housing member 53. Bearing bushings 73 may be press fitted into aligned bearing apertures in the pivot ears 72.

In the operation of the damper unit 15 or the damper unit 15', the torque scissors 17 assures a coupled relationship between the wheel-supporting member 11 and the damper unit on the strut support 10. When the wheel-supporting member 11 turns relative to the strut 10 during operational maneuvers which involve relatively slow turning or swiveling of the support or yoke member 11, substantially negative or zero resistance prevails in the damper unit. However, in the event of high frequency oscillatory or shimmy movements of the wheel-supporting yoke member 11 with respect to the strut 10, the resistance to shear of the viscous damping fluid in the damper operating between the parallel working surfaces therein resists, and dissipates or dampens the vibrations and thus prevents shimmy.

It will be apparent that either form of the viscous shimmy damper disclosed comprises a bare minimum of relatively simple and easily manufactured parts that can be produced economically by rapid mass production methods of manufacture and which can be assembled easily and quickly on an assembly line. Moreover, by reason of the few, simple and rugged and durable parts of which the damper is composed, the margin of manufacturing error is greatly reduced so that loss by rejection is greatly minimized. Also, there are no delicate parts that might be subject to damage in service or wearing out, so that the damper can be used indefinitely without replacement or repair.

It will be understood that modifications and variations may be effected without departing from the scope of the novel concepts of the present invention.

We claim as our invention:

1. In a directionally adjustable aircraft landing wheel supporting structure of the type including a pair of relatively rotatable support members, a housing structure relatively rotatably surrounding one of said members, said housing structure having an annular chamber therein of very narrow axial spacing but of substantial diameter, a single resistance disk stationary with and encircling said member and extending into said chamber, the inner faces of the opposite axial walls of the housing structure providing a single pair of opposed working surfaces in parallel spaced relation to the opposing surfaces of said single disk, and a connection externally of said members between the housing structure and the other of said members for rotation of the housing structure with said other member, said chamber having a viscous fluid therein and said opposed surfaces within the chamber and of said disk being operatively in shear film spacing with respect to the fluid so that rapid relative rotary movements of the housing with respect to said disk are restrained by the shearing action of the fluid between the surfaces of the chamber and the disk.

2. A shimmy damper adapted to be mounted in encircling relation about a member of an airplane wheel supporting structure, said damper comprising a ring hub, said hub having rotatable therewith a radially outwardly directed annular resistance disk of substantial diameter disposed in substantial spaced relation from both ends of the hub and provided with axially oppositely directed faces, and a housing enclosing said disk and rotatably mounted upon said hub at both sides of said disk, said housing having therein a chamber defined by axially facing walls having internal surfaces complementary to and opposing said disk faces in respectively closely spaced relation for operative shimmy damping coupling of the opposing surfaces and faces by a damping medium enclosed within the chamber.

3. A shimmy damper according to claim 2 wherein said disk comprises a plate stamped from sheet material and having its inner periphery of non-circular outline, and the hub has a complementary projecting portion thereon fitting said non-circular inner peripheral outline of the disk to key the disk for rotation with the hub.

4. In combination in a shimmy damper of the character described, a pair of opposed annular housing members of substantial diameter secured together at their outer peripheries in narrow spaced relation, integral respective oppositely directed axially extending bearing flanges on the inner peripheries of said members, a hub ring with which said flanges are in bearing and supported relation, a radially projecting axial positioning flange of limited thickness on said hub ring spaced substantially from both ends of said hub ring and engaging between the inner margins of said housing members, and a resistance disk of less thickness than said flange projecting radially from said flange into the space between said housing members.

BERNARD E. O'CONNOR.
BENJAMIN FUENTE.

References Cited in the file of this patent

UNITED STATES PATENTS

| Number | Name | Date |
|---|---|---|
| 1,718,175 | Nilson | June 18, 1929 |
| 2,061,656 | Guthrie | Nov. 24, 1936 |
| 2,339,450 | Ashton | Jan. 18, 1944 |
| 2,356,468 | Parker | Aug. 22, 1944 |
| 2,372,710 | Chisholm | Apr. 3, 1945 |
| 2,393,110 | Kops | Jan. 15, 1946 |
| 2,508,217 | Brell | May 16, 1950 |
| 2,514,137 | O'Connor | July 4, 1950 |

FOREIGN PATENTS

| Number | Country | Date |
|---|---|---|
| 580,127 | Great Britain | Aug. 28, 1946 |